(12) United States Patent
Ramamurthy et al.

(10) Patent No.: US 11,637,788 B2
(45) Date of Patent: Apr. 25, 2023

(54) UTILIZING A MODEL TO MANAGE RESOURCES OF A NETWORK DEVICE AND TO PREVENT NETWORK DEVICE OVERSUBSCRIPTION BY ENDPOINT DEVICES

(71) Applicant: Juniper Networks, Inc., Sunnyvale, CA (US)

(72) Inventors: Sai Sundar Ramamurthy, Sunnyvale, CA (US); Sunil Vallamkonda, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/302,813

(22) Filed: May 12, 2021

(65) Prior Publication Data
US 2022/0368648 A1 Nov. 17, 2022

(51) Int. Cl.
*H04L 47/80* (2022.01)

(52) U.S. Cl.
CPC .................................. *H04L 47/80* (2013.01)

(58) Field of Classification Search
CPC ...... H04L 47/80; H04L 47/828; H04L 47/805
See application file for complete search history.

(56) References Cited

U.S. PATENT DOCUMENTS

| 8,429,276 B1 | 4/2013 | Kumar et al. | |
| 11,146,498 B2* | 10/2021 | Gamage | H04L 47/822 |
| 2011/0268047 A1* | 11/2011 | Nath | H04W 8/186 |
| | | | 370/329 |
| 2015/0078158 A1 | 3/2015 | Boddu et al. | |
| 2016/0028595 A1 | 1/2016 | Ramakrishnan et al. | |
| 2016/0299776 A1* | 10/2016 | Richards | H04M 15/47 |
| 2018/0255122 A1* | 9/2018 | Hu | G06F 8/60 |
| 2020/0159572 A1* | 5/2020 | Jägemar | G06F 9/5066 |
| 2020/0311573 A1 | 10/2020 | Desai et al. | |
| 2021/0045131 A1* | 2/2021 | Vivanco | H04W 72/085 |
| 2022/0046652 A1* | 2/2022 | Yang | H04W 72/10 |
| 2022/0051159 A1* | 2/2022 | Shannon | G06Q 10/0639 |

OTHER PUBLICATIONS

Extended European Search Report for Application No. 21180629.4, dated Dec. 8, 2021, 12 pages.

\* cited by examiner

*Primary Examiner* — Minh Chau Nguyen
(74) *Attorney, Agent, or Firm* — Harrity & Harrity, LLP

(57) ABSTRACT

A network device may receive configuration data identifying resource subscription thresholds associated with a plurality of respective endpoint devices and may receive traffic from the plurality of endpoint devices. The network device may process the traffic and the configuration data, with a resource allocation model, to determine that processing traffic associated with a first endpoint device requires allocating a resource of the network device, and may process the configuration data, with the resource allocation model, to identify the resource of the network device from a particular resource of the network device that is currently allocated to traffic associated with a second endpoint device. The network device may allocate the particular resource of the network device to the traffic associated with the first endpoint device, and may process the traffic associated with the first endpoint device with the particular resource to generate processed traffic.

20 Claims, 10 Drawing Sheets

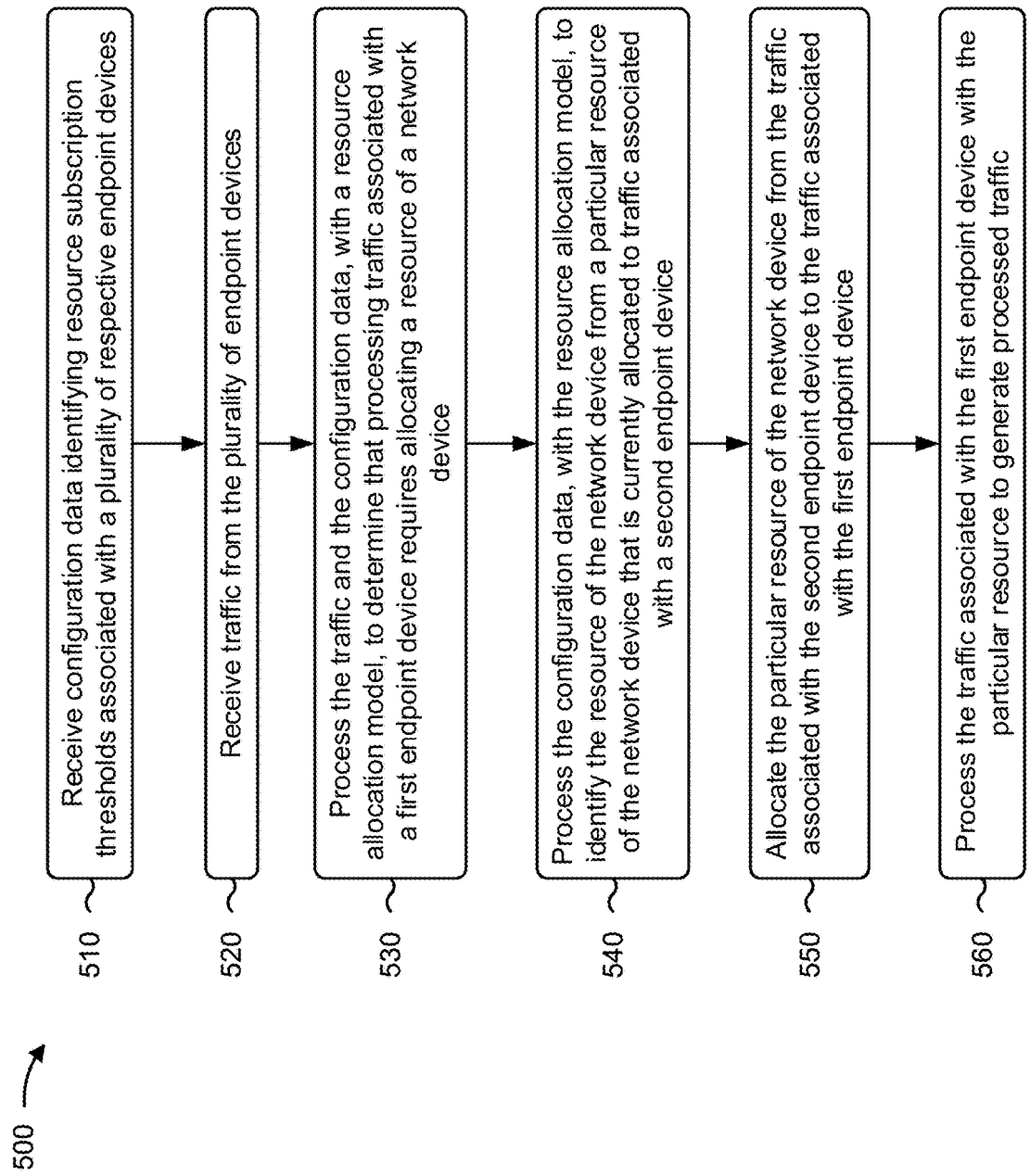

UTILIZING A MODEL TO MANAGE RESOURCES OF A NETWORK DEVICE AND TO PREVENT NETWORK DEVICE OVERSUBSCRIPTION BY ENDPOINT DEVICES

BACKGROUND

A network security device, such as a firewall, may monitor and control incoming and outgoing network traffic based on predetermined security rules. The network security device may monitor and control the incoming and outgoing network traffic to establish a barrier between a trusted network and an untrusted network, such as the Internet.

SUMMARY

In some implementations, a method may include receiving configuration data identifying resource subscription thresholds associated with a plurality of respective endpoint devices and receiving traffic from the plurality of endpoint devices. The method may include processing the traffic and the configuration data, with a resource allocation model, to determine that processing traffic associated with a first endpoint device requires allocating a resource of a network device, and processing the configuration data, with the resource allocation model, to identify the resource of the network device from a particular resource of the network device that is currently allocated to traffic associated with a second endpoint device. The method may include allocating the particular resource of the network device from the traffic associated with the second endpoint device to the traffic associated with the first endpoint device, and processing the traffic associated with the first endpoint device with the particular resource to generate processed traffic.

In some implementations, a network device includes one or more memories and one or more processors to receive configuration data identifying resource subscription thresholds associated with a plurality of respective endpoint devices, wherein the resource subscription thresholds include one or more of a processor threshold associated with a processor of the network device, a memory threshold associated with a memory of the network device, a network address threshold associated with network addresses of the network device, or a network port threshold associated with network ports of the network device. The one or more processors may receive traffic from the plurality of endpoint devices and may process the traffic and the configuration data, with a resource allocation model, to determine that processing traffic associated with a first endpoint device requires allocating a resource of the network device. The one or more processors may process the configuration data, with the resource allocation model, to identify the resource of the network device from a particular resource of the network device that is currently allocated to traffic associated with a second endpoint device, and may allocate the particular resource of the network device from the traffic associated with the second endpoint device to the traffic associated with the first endpoint device. The one or more processors may process the traffic associated with the first endpoint device with the particular resource to generate processed traffic, and may perform one or more actions based on the processed traffic.

In some implementations, a non-transitory computer-readable medium may store a set of instructions that includes one or more instructions that, when executed by one or more processors of a network device, cause the network device to receive configuration data identifying resource subscription thresholds associated with a plurality of respective endpoint devices and receive traffic from the plurality of endpoint devices. The one or more instructions may cause the network device to process the traffic and the configuration data, with a resource allocation model, to determine that processing traffic associated with a first endpoint device requires allocating a resource of the network device, and process the configuration data, with the resource allocation model, to identify the resource of the network device from a particular resource of the network device that is currently allocated to traffic associated with a second endpoint device. The one or more instructions may cause the network device to allocate the particular resource of the network device from the traffic associated with the second endpoint device to the traffic associated with the first endpoint device, and process the traffic associated with the first endpoint device with the particular resource to generate processed traffic.

BRIEF DESCRIPTION OF THE DRAWINGS

FIG. 5 is a flowchart of an example process for utilizing a model to manage resources of a network device and to prevent network device oversubscription by endpoint devices.

DETAILED DESCRIPTION

Figure 1A:
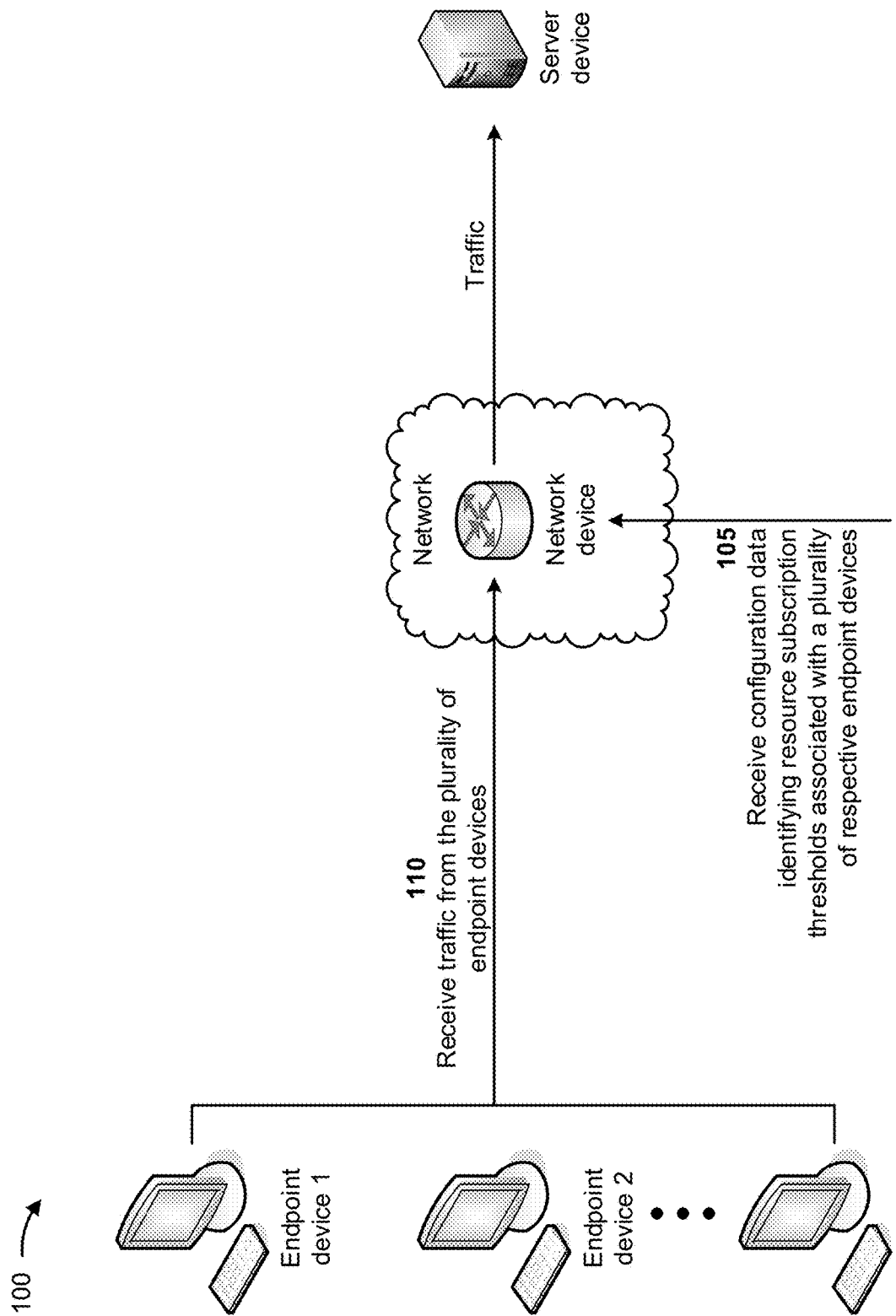
FIGS. 1A-1F are diagrams of an example associated with utilizing a model to manage resources of a network device and to prevent network device oversubscription by endpoint devices.

The following detailed description of example implementations refers to the accompanying drawings. The same reference numbers in different drawings may identify the same or similar elements.

A network device, such as a firewall, may have insufficient resources (e.g., processing resources, memory resources, communication resources, and/or the like) to accommodate a new connection and/or a new service through the network device when the resources of the network device are completely used by a set of endpoint devices. For example, three endpoint devices A, B, and C may utilize a network device, and the endpoint devices A and C may utilize most of the resources of the network device. Even though the network device may utilize fewer resources to process traffic associated with the endpoint device B relative to resources utilized to process traffic associated with the endpoint device A and/or the endpoint device C, the processing of traffic associated with the endpoint device B may be negatively impacted due to the utilization of resources associated with processing traffic associated with the endpoint device A and/or the endpoint device C. For example, the network device may have insufficient resources to establish a new communication session for the traffic associated with the endpoint device B, the network device may drop the traffic associated with the endpoint device B, and/or the like.

Some implementations described herein relate to a network device that utilizes a model to manage resources of the network device and to prevent network device oversubscription by endpoint devices. For example, the network device may receive configuration data identifying resource subscription thresholds associated with a plurality of respective endpoint devices and may receive traffic from the plurality of endpoint devices. The network device may process the traffic and the configuration data, with a resource allocation model, to determine that processing traffic associated with a first endpoint device requires allocating a resource of a network device, and may process the configuration data, with the resource allocation model, to identify the resource of the network device from a particular resource of the network device that is currently allocated to traffic associated with a second endpoint device. The network device may allocate the particular resource of the network device from the traffic associated with the second endpoint device to the traffic associated with the first endpoint device, and may process the traffic associated with the first endpoint device with the particular resource to generate processed traffic.

In this way, the network device utilizes a model to manage resources of the network device and to prevent network device oversubscription by endpoint devices. The network device may reserve resources of the network device for particular endpoint devices. When resource eviction rules are configured at the network device, the particular endpoint devices may oversubscribe to resources of the network device. If an endpoint device is not allocated resources of the network device and utilization of the endpoint device is less than a configured resource limit, then the network device may reallocate resources from other endpoint devices that exceed configured resource limits. The network device may utilize a model (e.g., a heuristic model, a machine learning model, and/or the like) to determine requirements for a particular type of traffic and to determine resources of the network device to allocate for the particular type of traffic. Thus, the network device conserves computing resources, networking resources, and/or other resources that would otherwise have been consumed by losing traffic of an endpoint device not allocated resources of the network device, attempting to recover the lost traffic, retransmitting the lost traffic, handling complaints from the endpoint device, among other examples.

FIGS. 1A-1F are diagrams of an example 100 associated with utilizing a model to manage resources of a network device and to prevent network device oversubscription by endpoint devices. As shown in FIGS. 1A-1F, example 100 includes a server device communicating with multiple endpoint devices (e.g., endpoint device 1 through endpoint device N, as shown in FIG. 1A) via a network that includes a network device. The server device may include a laptop computer, a tablet computer, a desktop computer, a group of server devices, or a similar type of device. Each endpoint device may include a mobile phone (e.g., a smart phone or a radiotelephone), a laptop computer, a tablet computer, a desktop computer, and/or the like. The network device may include a router, a gateway, a switch, a firewall, a hub, a bridge, a reverse proxy, a server, an endpoint device, among other examples. The server device, the endpoint device, the network device, and the network are described in greater detail below with respect to FIGS. 2-4.

As shown in FIG. 1A, and by reference number 105, the network device receives configuration data identifying resource subscription thresholds associated with a plurality of respective endpoint devices. For example, the network device may receive configuration data identifying a first set of resource subscription thresholds associated with a first endpoint device (e.g., endpoint device 1, as shown), a second set of resource subscription thresholds associated with a second endpoint device (e.g., endpoint device 2, as shown), and/or the like.

A set of resource subscription thresholds associated with an endpoint device may include information identifying a set of computing resources (e.g., processing resources, memory resources, communication resources, and/or the like) of the network device that are reserved for the endpoint device. For example, a set of resource subscription thresholds associated with an endpoint device may include a processor threshold associated with processing resources of the network device, a memory threshold associated with memory resources of the network device, a network address threshold associated with network addresses of the network device, a network port threshold associated with network ports of the network device, and/or the like.

In some implementations, a resource threshold for a particular resource of the network device includes a plurality of resource thresholds. As an example, a processor threshold associated with processing resources of the network device may include a maximum processor threshold and/or a minimum processor threshold. The maximum processor threshold may correspond to an amount (e.g., 20%, 25%, 30%, and/or the like) of the processing resource allocated to the endpoint device. The minimum processor threshold may correspond to a minimum amount of the processing resources to be allocated to the endpoint device, as described in greater detail below.

In some implementations, the resource subscription thresholds are associated with a plurality of zones that include the endpoint devices. For example, a first endpoint device (e.g., endpoint device 1, as shown in FIG. 1A) may be associated with a first zone, a second endpoint device (e.g., endpoint device 2, as shown in FIG. 1A) may be associated with a second zone, and/or the like. In some implementations, a zone, of the plurality of zones, includes a group of endpoint devices associated with a common characteristic. For example, a zone may include a group of endpoint devices associated with a same subscriber, a same business unit of an entity, a same location (e.g., a same neighborhood, a same building, a same floor of a building, and/or the like), a same quality of service, and/or the like. In these implementations, the configuration data may include information identifying a set of resource subscription thresholds for one or more zones of the plurality of zones associated with the endpoint devices.

In some implementations, the network device receives the configuration data from a device associated with a service provider associated with the endpoint devices, the network device, and/or the network. For example, the network device may receive the configuration data from a network device included in a core network of the service provider, a device associated with a network administrator, and/or the like. The network device may receive the configuration data periodically (e.g., hourly, daily, weekly, and/or the like), based on providing a request for the configuration data, and/or the like.

In some implementations, the network device allocates resources of the network device to each endpoint device based on the set of respective resource thresholds associated with the endpoint devices. For example, the network device may determine a set of resource thresholds associated with an endpoint device. The network device may identify a respective maximum resource threshold for each resource of the network device based on the set of resource thresholds.

The network device may allocate resources of the network device to the endpoint device based on the identified maximum resource thresholds.

In some implementations, the configuration data identifies resource subscription thresholds associated with a plurality of zones associated with the endpoint devices. The network device may allocate resources of the network device to each zone, of the plurality of zones, based on the respective set of resource subscription thresholds associated with the plurality of zones in a manner similar to that described above.

As shown by reference number 110, the network device receives traffic from the plurality of endpoint devices. The network device may receive the traffic from the plurality of endpoint devices based on allocating the resources to the endpoint devices and/or the plurality of zones.

Figure 1B:
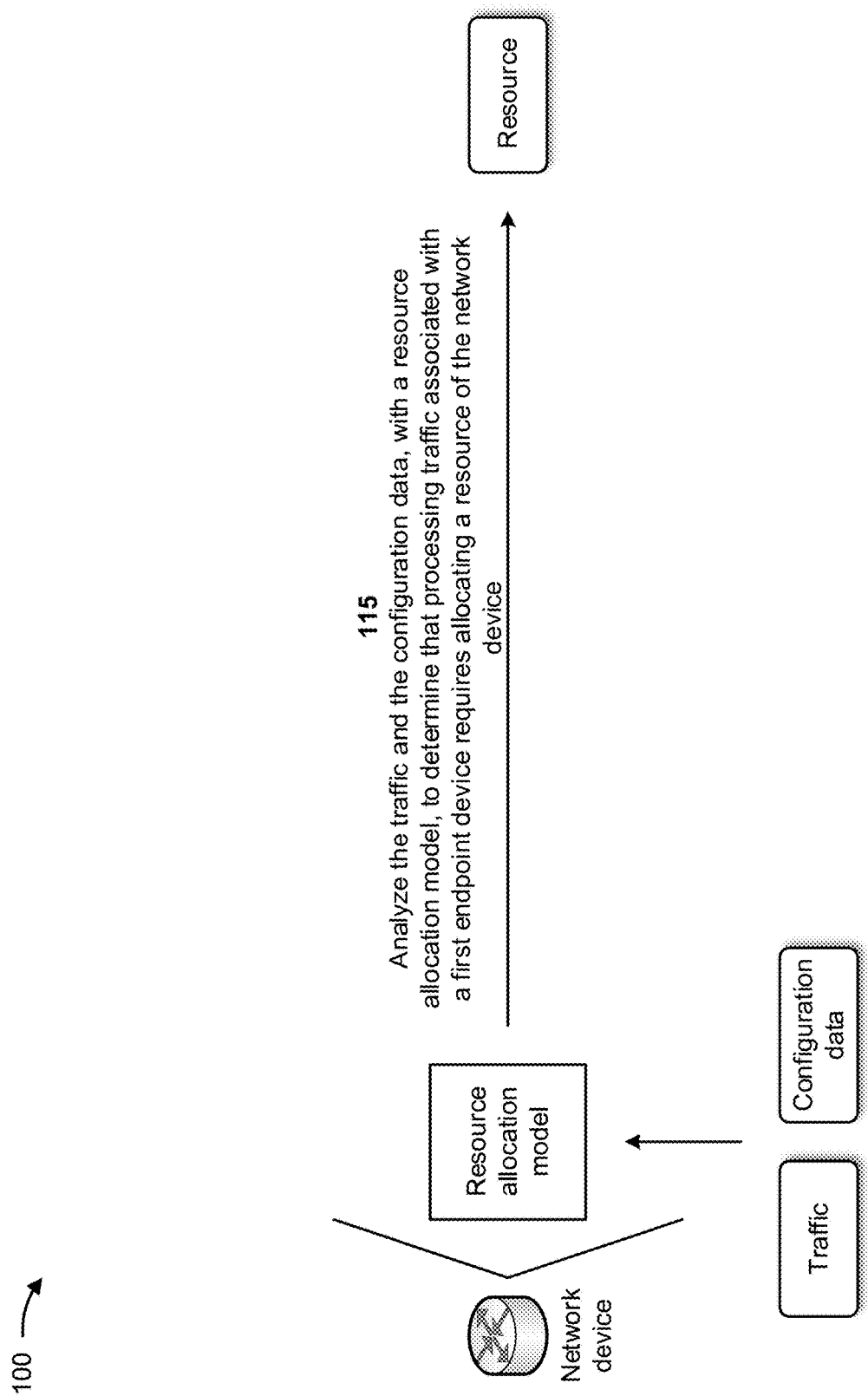

As shown in FIG. 1B, and by reference number 115, the network device analyzes the traffic and the configuration data, with a resource allocation model, to determine that processing traffic associated with a first endpoint device (e.g., endpoint device 1, as shown in FIG. 1A) requires allocating a resource of the network device. The resource allocation model may include a heuristic model, a machine learning model, a regression algorithm, a linear regression algorithm, and/or the like. The resource allocation model may analyze traffic received from the first endpoint device and may estimate resources of the network device associated with processing the traffic. For example, the resource allocation model may analyze the traffic and may output an estimated utilization of a processor resource associated with a processor of the network device, a memory resource associated with a memory of the network device, and/or a communication resource (e.g., a network address associated with the network device, a network port associated with the network device, a bandwidth, and/or the like) associated with processing the traffic.

In some implementations, the estimated resources are determined based on an application associated with the traffic. In some implementations, the network device determines the application associated with the traffic based on information included in the traffic. For example, the traffic (e.g., a data packet) may include an application identifier associated with an application, a name of an application, and/or the like.

Alternatively, and/or additionally, the network device may determine the application associated with the traffic based on a set of heuristic rules. The network device may utilize the set of heuristic rules to identify data, types of data, patterns of data, and/or the like in the traffic and may compare the data, the types of data, the patterns of data, and/or the like to data, types of data, patterns of data, and/or the like associated with a plurality of applications. The network device may determine the application associated with the traffic based on the comparison.

In some implementations, the network device trains the resource allocation model to determine an application associated with the traffic. The resource allocation model may be trained based on historical data relating to traffic transmitted by and/or received from the endpoint devices and historical data relating to applications with which the traffic is associated. The resource allocation model may be trained to determine, based on information regarding traffic received by the network device, an application associated with the traffic and a confidence score that reflects a measure of confidence that the application is accurately determined for this traffic. Alternatively, and/or additionally, the network device may receive a trained resource allocation model from another device.

The network device may estimate the resources based on the application. In some implementations, the network device may estimate the resources based on accessing a data structure (e.g., a database, a table, a list, and/or the like) storing information associating applications with resource estimates.

Alternatively, and/or additionally, the network device may utilize the resource allocation model to estimate the resources. In some implementations, the network device trains the resource allocation model to estimate the resources based on the application associated with the traffic. The resource allocation model may be trained based on historical data relating to traffic transmitted by and/or received from the endpoint devices and historical data relating to resources utilized to process the traffic based on applications with which the traffic is associated. The resource allocation model may be trained to determine, based on information regarding traffic received by the network device, an estimate of resources associated with processing the traffic and a confidence score that reflects a measure of confidence that the estimate is accurately determined for this traffic. Alternatively, and/or additionally, the network device may receive a trained resource allocation model from another device.

In some implementations, the network device determines whether the resources allocated to the first endpoint device (and/or a zone associated with the first endpoint device) are sufficient to process the traffic received from the first endpoint device based on the estimated resources. For example, the network device may determine whether adding the estimated resource (e.g., a processor resource, a memory resource, a communication resource, and/or the like) to a current utilization of the resource by the first endpoint device exceeds the amount of the resource allocated to the first endpoint device (e.g., whether a sum of the estimated resource and the current utilization of the resource satisfies (e.g., exceeds) the maximum resource threshold for the resource).

In some implementations, the network device determines that the allocated resources are sufficient to process the traffic received from the first endpoint device. In these implementations, the network device may utilize a portion of the allocated resources to process the traffic.

Figure 1C:
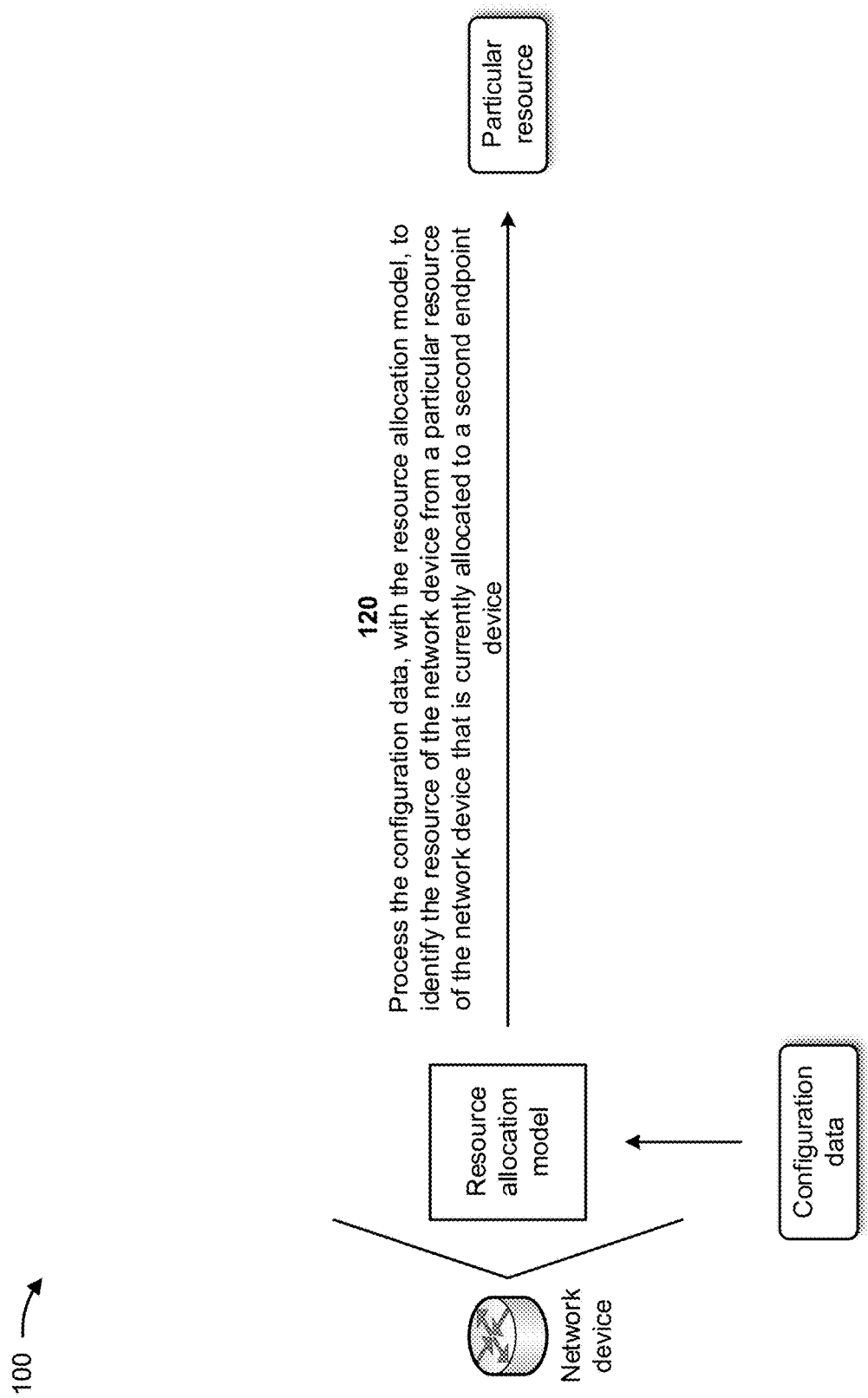

In some implementations, the network device determines that the allocated resources are insufficient to process the traffic received from the first endpoint device. In these implementations, as shown in FIG. 1C, and by reference number 120, the network device processes the configuration data, with the resource allocation model, to identify the resource of the network device from a particular resource of the network device that is currently allocated to a second endpoint device (e.g., endpoint device 2, as shown in FIG. 1A).

In some implementations, the network device identifies the resource based on determining that the resource allocated to the second endpoint device can be re-allocated to the first endpoint device. In some implementations, the network device determines that the resource allocated to the second endpoint device can be re-allocated to the first endpoint device when the first endpoint device is associated with an eviction scheme. The eviction scheme may include a set of criteria for re-allocating the resource from the first endpoint device and back to the second endpoint device, as described in greater detail below.

In some implementations, the network device determines that the resource allocated to the second endpoint device can be re-allocated to the first endpoint device when the traffic received from the first endpoint device is a type of traffic that can be evicted. For example, the network device may determine that the resource allocated to the second endpoint device can be re-allocated to the first endpoint device when the traffic received from the first endpoint device is a low priority traffic (e.g., as opposed to a high priority traffic, such as voice data), when a subscriber agreement associated with the first endpoint device permits eviction, and/or the like.

In some implementations, the network device determines that the resource allocated to the second endpoint device can be re-allocated to the first endpoint device based on a current utilization of the particular resource by the network device to process traffic received from the second endpoint device. For example, the network device may determine that the resource allocated to the second endpoint device can be re-allocated to the first endpoint device when an amount of available resources, of the type of resource allocated to the second endpoint device (e.g., an amount of available processing resources, of the processing resources initially allocated to the second endpoint device), exceeds an amount of the resource to be re-allocated to the first endpoint device.

As an example, the network device may allocate 30% of the processing resources of the network device to the second endpoint device. The network device may determine that 10% of the processing resources may be re-allocated to the first endpoint device when the current utilization of the processing resources by the network device to process traffic received from the second endpoint device is less than 20%.

In some implementations, the network device may determine that the network device is utilizing the particular resource to process traffic associated with an application of the second endpoint device with a lower priority relative to a priority of an application associated with the first endpoint device. The network device may identify the resource and/or may determine that the resource can be re-allocated to the first endpoint device based on the network device utilizing the particular resource to process the traffic associated with the application of the second endpoint device with the lower priority relative to the priority of the application associated with the first endpoint device.

In some implementations, the network device may determine that the network device is utilizing the particular resource to process the traffic associated with the second endpoint device with a lower priority than the traffic associated with the first endpoint device. The network device may identify the resource and/or may determine that the resource can be re-allocated to the first endpoint device based on the network device utilizing the particular resource to process the traffic associated with the second endpoint device with the lower priority than the traffic associated with the first endpoint device.

Figure 1D:
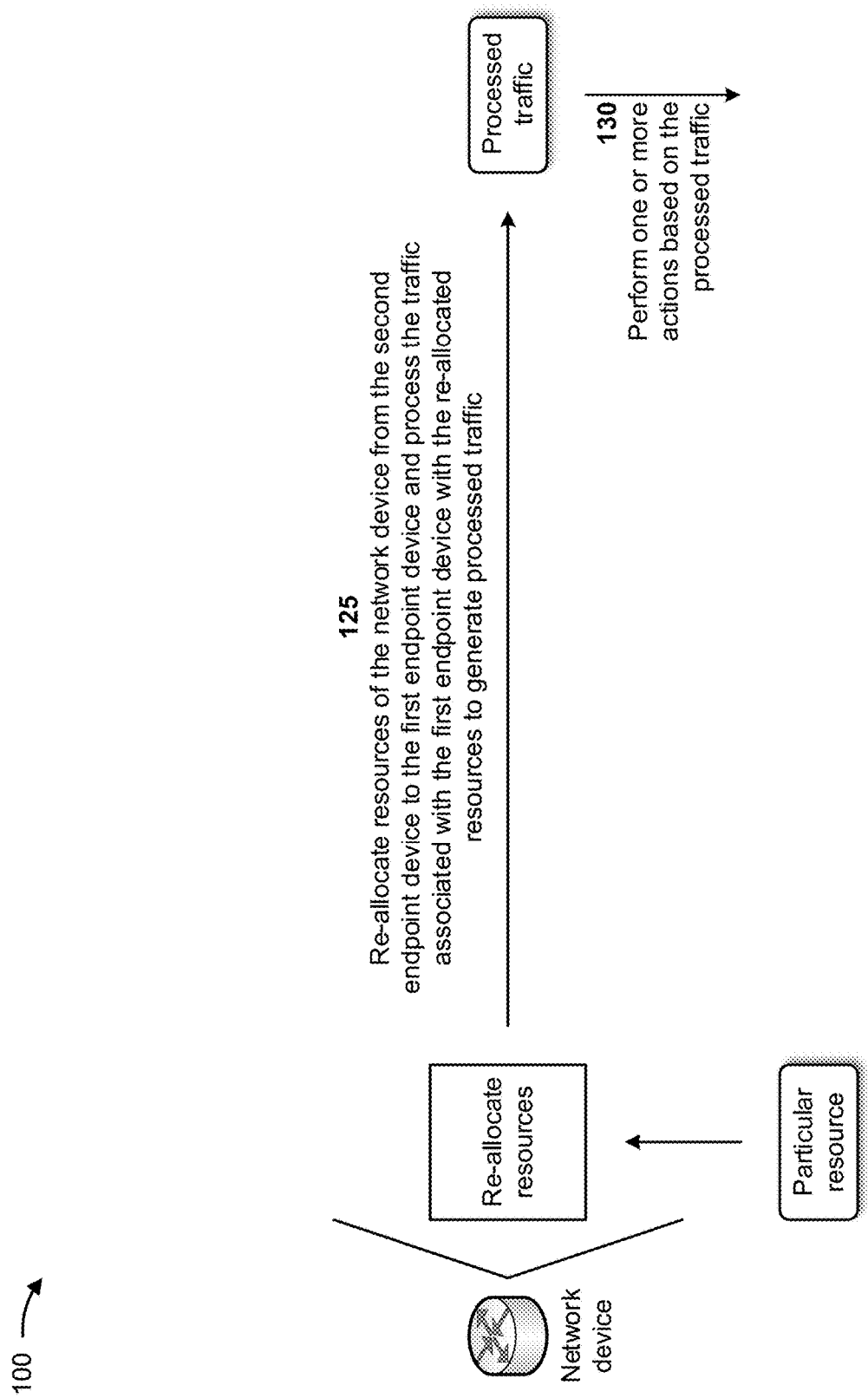

As shown in FIG. 1D, and by reference number 125, the network device re-allocates the resources of the network device from the second endpoint device to the first endpoint device and processes the traffic associated with the first endpoint device with the re-allocated resources to generate processed traffic. As shown by reference number 130, the network device performs one or more actions based on the processed traffic.

For example, the network device may cause the processed traffic to be routed to a destination, may identify a security issue associated with the traffic based on processing the traffic, may prevent the processed traffic from being routed to the destination due to a security issue with the processed traffic, may store the processed traffic, and/or the like. Alternatively, and/or additionally, the network device may provide a recommendation that resources be installed in the network device, provide a recommendation that an additional network device be installed in a network associated with the network device, and/or the like based on re-allocating the resource from the second endpoint device to the first endpoint device.

Figure 1E:
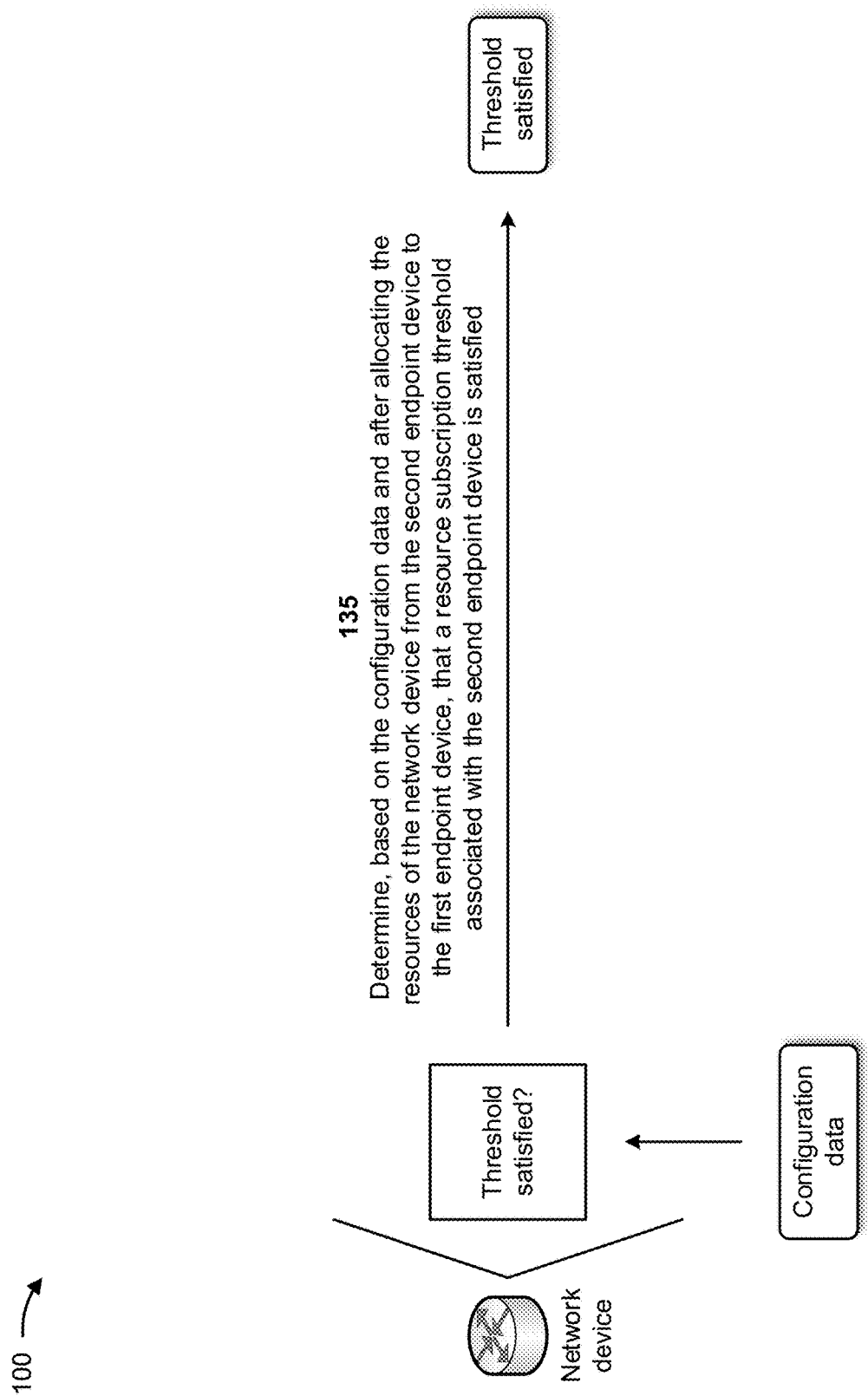

As shown in FIG. 1E, and by reference number 135, the network device determines, based on the configuration data and after allocating the particular resource of the network device from the second endpoint device to the first endpoint device, that a resource subscription threshold associated with the second endpoint device is satisfied. The resource subscription threshold may include a processor threshold associated with a processor of the network device, a memory threshold associated with a memory of the network device, a network address threshold associated with network addresses of the network device, a network port threshold associated with network ports of the network device, and/or the like.

As an example, the network device may initially allocate 30% of a resource of the network device to the first endpoint device (e.g., to process traffic received from the first endpoint device) and may initially allocate 30% of the resource to the second endpoint device. The network device may currently be utilizing 40% of the resource to process traffic received from the first endpoint device (e.g., 30% initially allocated to the first endpoint device and 10% of the resource reallocated from the second endpoint device and to the first endpoint device) and 15% of the resource to process traffic received from the second endpoint device. The network device may receive additional traffic from the second endpoint device. The network device may determine that 10% of the resource is required to process the additional traffic in a manner similar to that described above.

The network device may determine a maximum resource threshold (e.g., 30%) associated with the resource based on the configuration data. The network device may determine that the maximum resource threshold is satisfied based on utilizing 10% of the resource to process the additional traffic. For example, the network device may determine that utilizing 10% of the resource to process the additional traffic and 15% of the resource to process the initial traffic received from the second endpoint device is less than the maximum resource threshold of 30% for the resource.

Figure 1F:
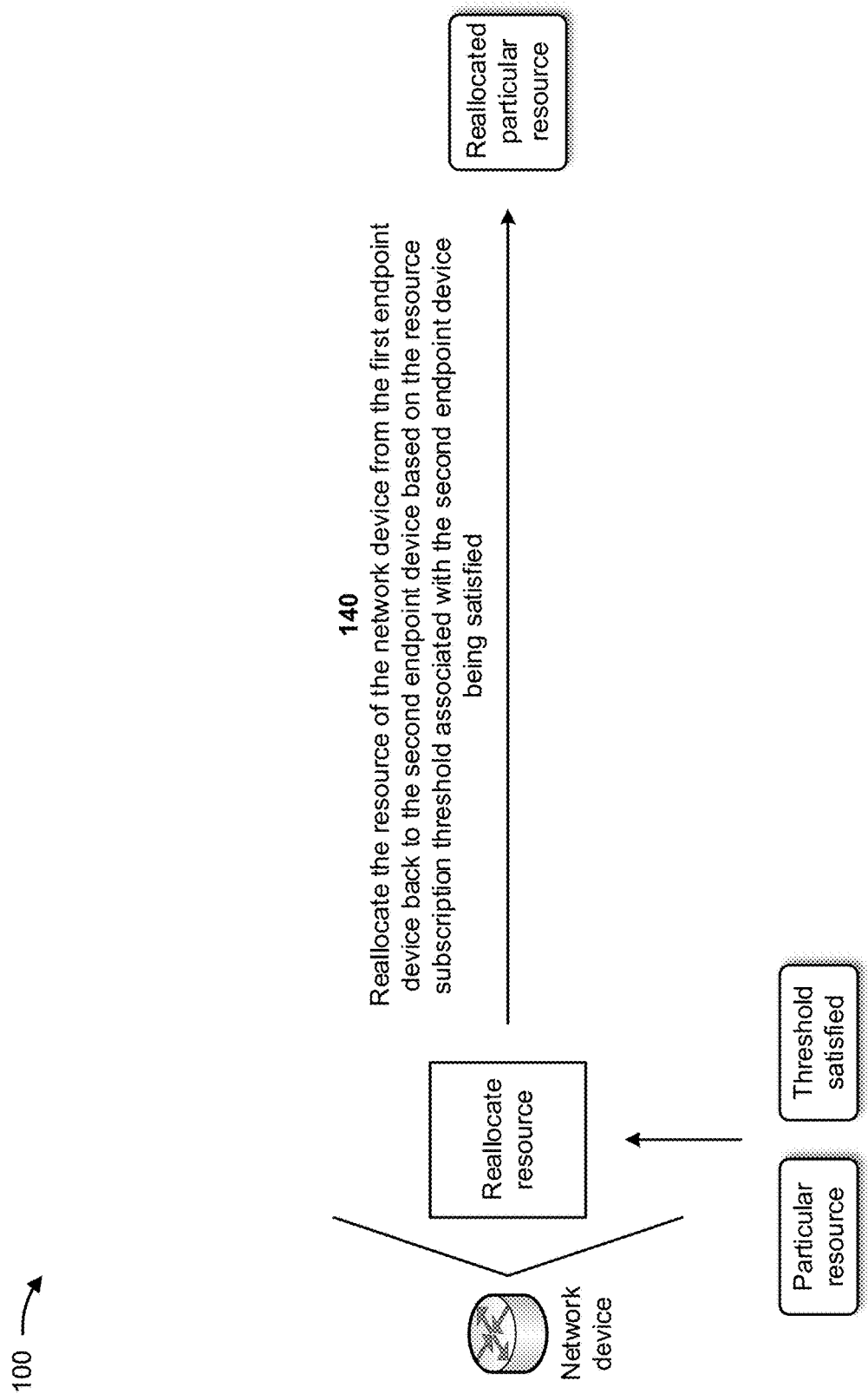

As shown in FIG. 1F, and by reference number 140, the network device reallocates the resource of the network device from the first endpoint device back to the second endpoint device based on the resource subscription threshold associated with the second endpoint device being satisfied. In some implementations, the network device reallocates the resource based on an eviction scheme. For example, the network device may reallocate the resource based on a general eviction scheme, a processor resource eviction scheme, a memory resource eviction scheme, a communication resource eviction scheme, an application eviction scheme, and/or a time of day eviction scheme.

The general eviction scheme may identify an order of eviction associated with re-allocating resources used to process traffic associated with one or more applications. For example, the general eviction scheme may indicate an order in which one or more eviction schemes (e.g., the processor resource eviction scheme, the memory resource eviction scheme, the communication resource eviction scheme, the application eviction scheme, and/or the time of day eviction scheme) are to be applied, to identify the resources that are to be reallocated back to the second endpoint device.

The processor resource eviction scheme may indicate a set of processor resource eviction rules for identifying processor resources to be re-allocated back to the second endpoint device. For example, the set of processor resource eviction rules may include a rule associated with allocating processor resources utilized to process traffic associated with an amount of bandwidth that satisfies a bandwidth threshold, processor resources utilized to process traffic associated with an oldest communication session relative to other communication sessions associated with the first endpoint device, and/or the like. Alternatively, and/or additionally, the set of processor eviction rules may indicate a maximum amount of processor resources that can be reallocated away from (e.g., evicted) the first endpoint device within a time period. For example, the set of processor eviction rules may indicate that no more than 10% of the processor resources of the network device can be evicted from the first endpoint device within a five minute time period.

The memory resource eviction scheme may indicate a set of memory resource eviction rules for identifying memory resources to be re-allocated back to the second endpoint device. For example, the set of memory resource eviction rules may include a rule associated with allocating memory resources utilized to process traffic associated with an amount of bandwidth that satisfies a bandwidth threshold, memory resources utilized to process traffic associated with an oldest communication session relative to other communication sessions associated with the first endpoint device, and/or the like. Alternatively, and/or additionally, the set of memory eviction rules may indicate a maximum amount of memory resources that can be evicted from the first endpoint device within a time period in a manner similar to that described above.

The communication resource eviction scheme may indicate a set of communication resource eviction rules for identifying communication resources (e.g., bandwidth, addresses, ports, and/or the like) to be re-allocated back to the second endpoint device. For example, the set of communication resource eviction rules may include a rule associated with allocating communication resources utilized to process traffic associated with an amount of bandwidth that satisfies a bandwidth threshold, communication resources utilized to process traffic associated with an oldest communication session relative to other communication sessions associated with the first endpoint device, and/or the like. Alternatively, and/or additionally, the set of communication eviction rules may indicate a maximum amount of communication resources that can be evicted from the first endpoint device within a time period in a manner similar to that described above.

The application eviction scheme may include a set of application rules for re-allocating the resources used to process traffic associated with the one or more applications. In some implementations, the set of application rules includes a priority rule. For example, the application eviction scheme may include information identifying a plurality of applications associated with traffic processed by the network device. Each application, of the plurality of applications, may be associated with a priority, a ranking, and/or the like relative to the other applications of the plurality of applications. The priority rule may provide that resources utilized to process traffic associated with a first application, of the plurality of applications, associated with a first priority are to be reallocated prior to resources utilized to process traffic associated with a second application, of the plurality of applications, associated with a second priority, based on the second priority being a higher priority relative to the first priority.

The time of day eviction scheme may identify an eviction time period during which the resource can be reallocated back to the second endpoint device. For example, the time of day eviction scheme may identify a starting time and/or an ending time of the eviction time period (e.g., from 9:00 am until 5:00 pm) and/or an amount of time following the resource being re-allocated to the first endpoint device (e.g., 10 minutes, 30 minutes, 1 hour, and/or the like), among other examples.

In this way, the network device utilizes a model to manage resources of the network device and to prevent network device oversubscription by endpoint devices. The network device may reserve resources of the network device for particular endpoint devices. When resource eviction rules are configured at the network device, the particular endpoint devices may oversubscribe to resources of the network device. If an endpoint device is not allocated resources of the network device and utilization of the endpoint device is less than a configured resource limit, then the network device may reallocate resources from other endpoint devices that exceed configured resource limits. The network device may utilize a model (e.g., a heuristic model, a machine learning model, and/or the like) to determine requirements for a particular type of traffic and to determine resources of the network device to allocate for the particular type of traffic. Thus, the network device conserves computing resources, networking resources, and/or other resources that would otherwise have been consumed by losing traffic of an endpoint device not allocated resources of the network device, attempting to recover the lost traffic, retransmitting the lost traffic, handling complaints from the endpoint device, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
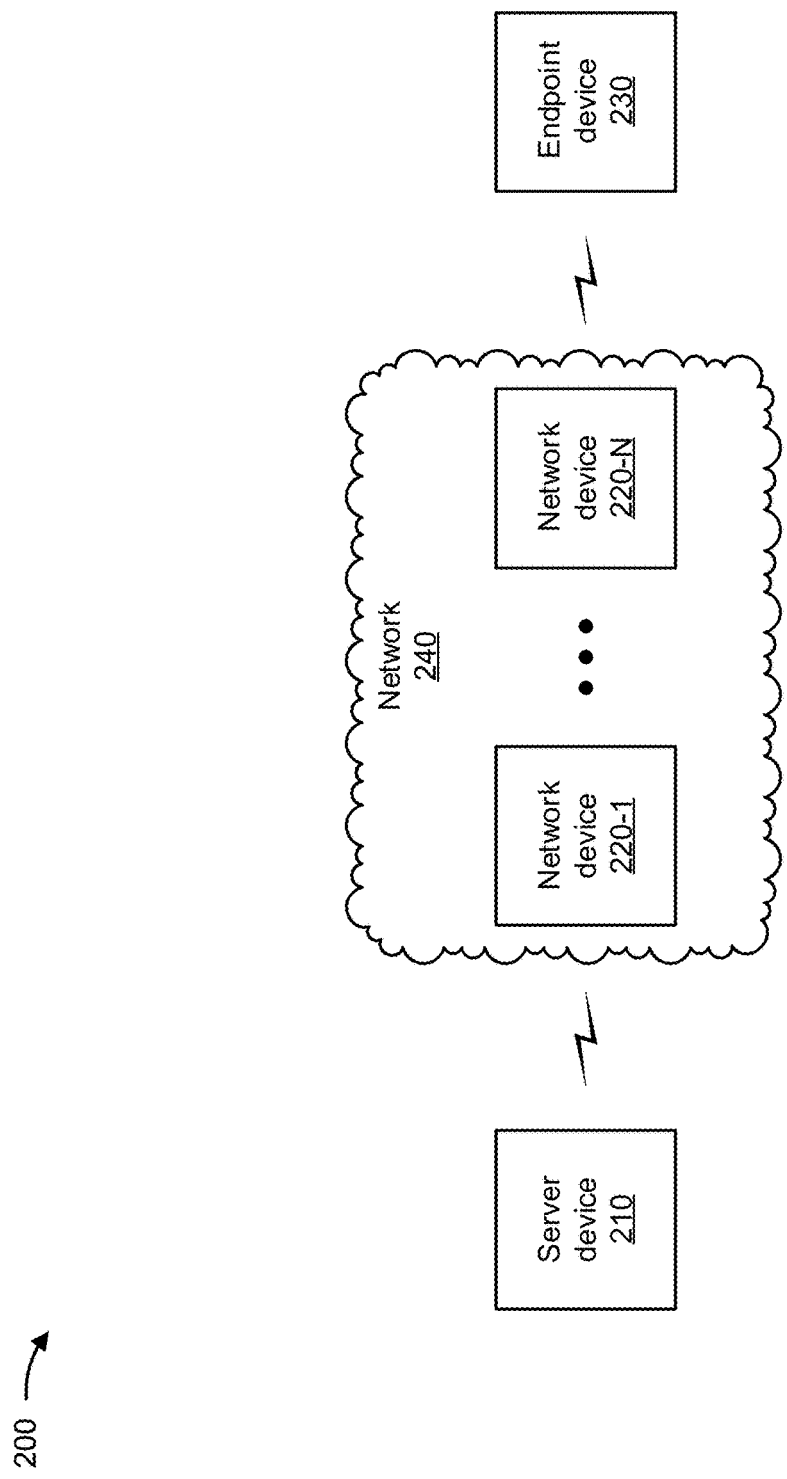
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a group of network devices 220 (shown as network device 220-1 through network device 220-N), an endpoint device 230, and a network 240. Devices of environment 200 may interconnect via wired connections, wireless connections, or a combination of wired and wireless connections.

Server device 210 includes one or more devices capable of receiving, generating, storing, processing, and/or providing information, such as information described herein. For example, server device 210 may include a laptop computer, a tablet computer, a desktop computer, a group of server devices, or a similar type of device. In some implementations, server device 210 may receive information from and/or transmit information (e.g., traffic) to endpoint device 230, via network 240 (e.g., by routing packets using network devices 220 as intermediaries).

Network device 220 includes one or more devices capable of receiving, processing, storing, routing, and/or providing traffic (e.g., a packet or other information, metadata, and/or the like) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a key server network device and/or a peer network device, among other examples. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Endpoint device 230 includes one or more devices capable of receiving, generating, storing, processing, and/or providing information, such as information described herein. For example, endpoint device 230 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 230 may receive network traffic from and/or may provide network traffic to server device 210 and/or other endpoint devices 230, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
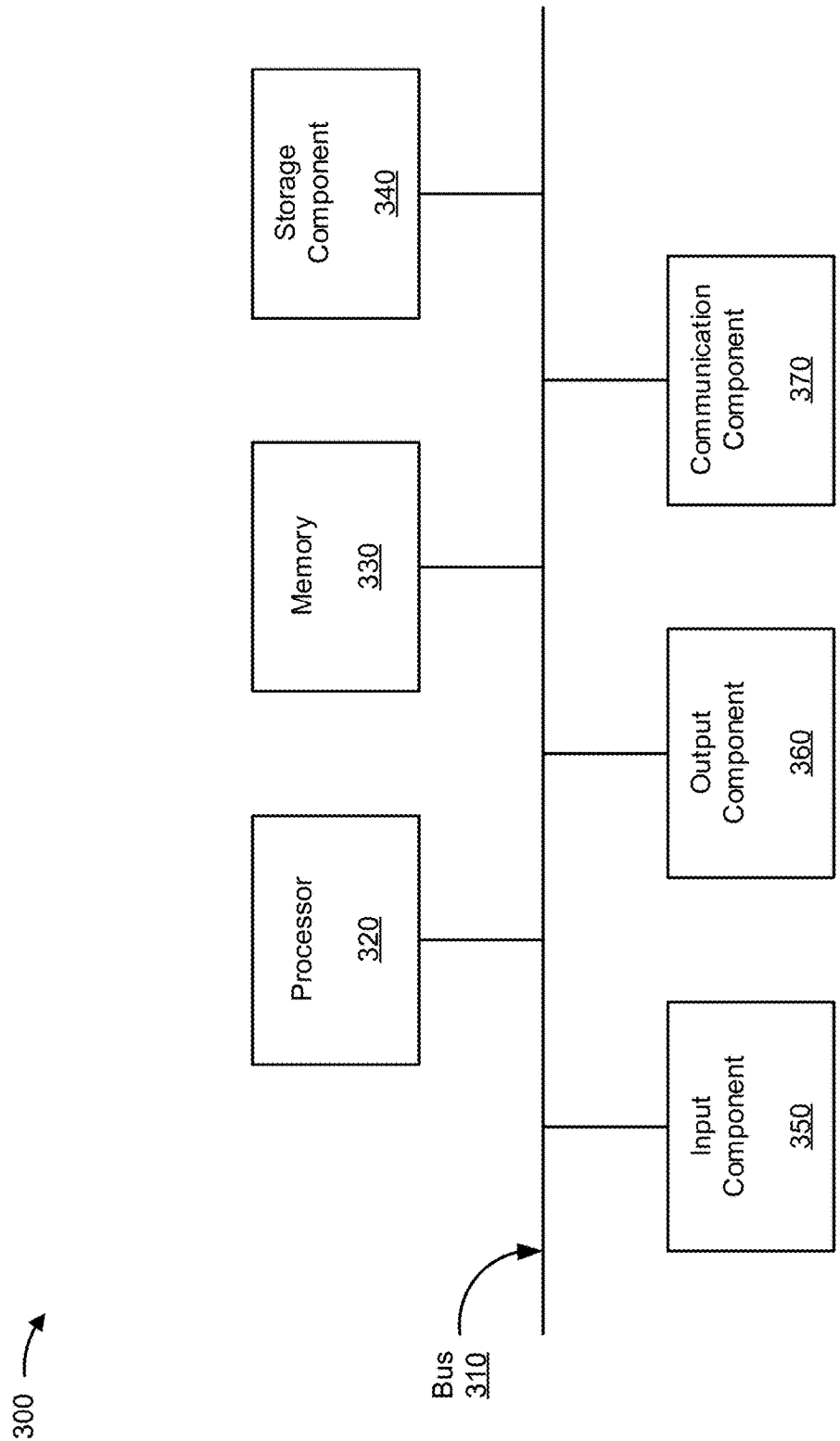
FIGS. 3 and 4 are diagrams of example components of one or more devices of FIG. 2.

FIG. 3 is a diagram of example components of one or more devices of FIG. 2. The example components may be included in a device 300, which may correspond to server device 210, network device 220, and/or endpoint device 230. In some implementations, server device 210, network device 220, and/or endpoint device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
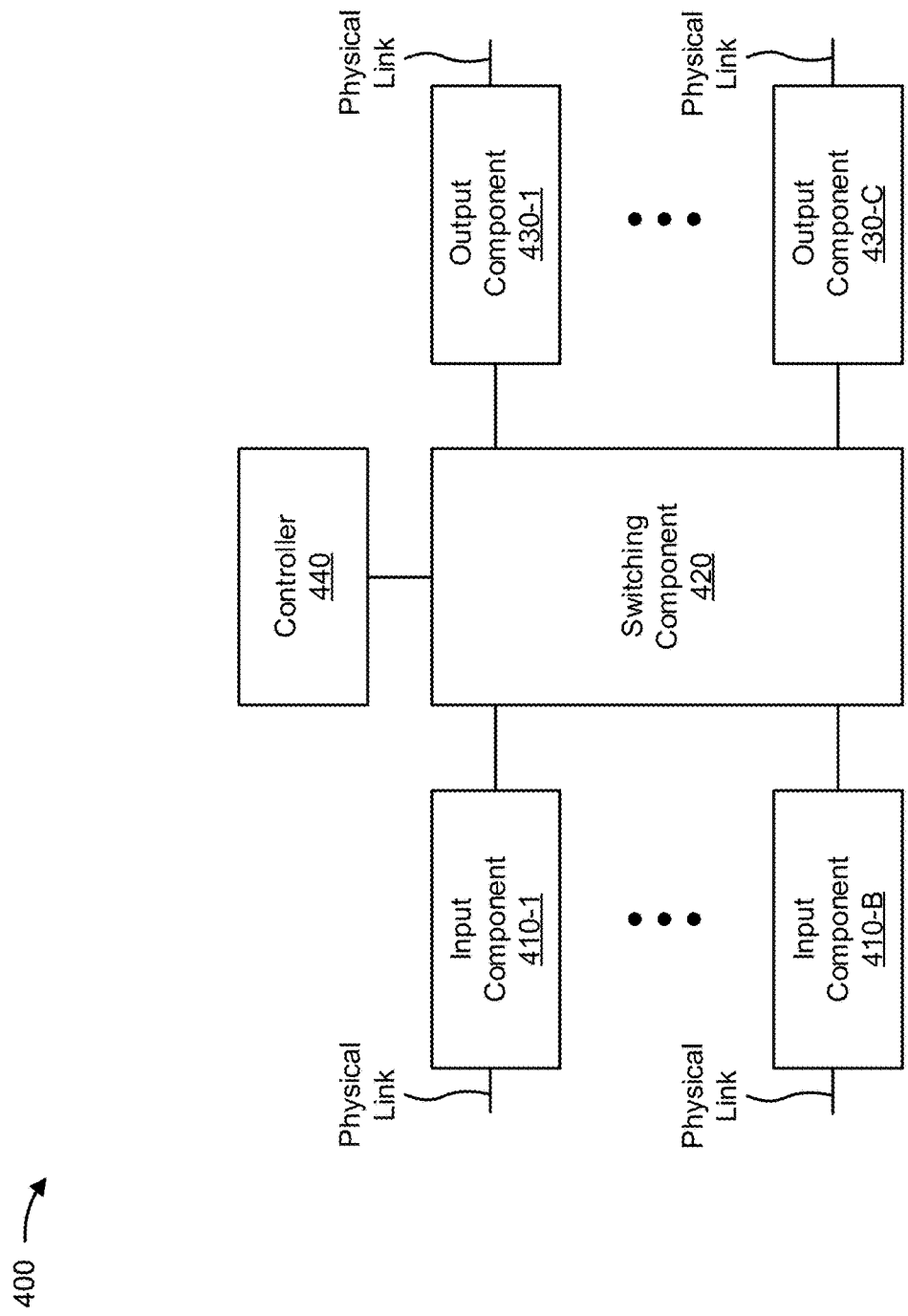

FIG. 4 is a diagram of example components of one or more devices of FIG. 2. The example components may be included in a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a model to manage resources of the network device and to prevent network device oversubscription by endpoint devices. In some implementations, one or more process blocks of FIG. 5 may be performed by a network device (e.g., network device 220). In some implementations, one or more process blocks of FIG. 5 may be performed by another device or a group of devices separate from or including the device, such as a server device (e.g., server device 210) and/or an endpoint device (e.g., endpoint device 230). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving configuration data identifying resource subscription thresholds associated with a plurality of respective endpoint devices (block 510). For example, the network device may receive configuration data identifying resource subscription thresholds associated with a plurality of respective endpoint devices, as described above. In some implementations, the network device includes a network security device. The resource subscription thresholds may include a processor threshold associated with a processor of the network device, a memory threshold associated with a memory of the network device, a network address threshold associated with network addresses of the network device, a network port threshold associated with network ports of the network device, and/or the like.

As further shown in FIG. 5, process 500 may include receiving traffic from the plurality of endpoint devices (block 520). For example, the network device may receive traffic from the plurality of endpoint devices, as described above.

As further shown in FIG. 5, process 500 may include processing the traffic and the configuration data, with a resource allocation model, to determine that processing traffic associated with a first endpoint device requires allocating a resource of the network device (block 530). For example, the network device may process the traffic and the configuration data, with a resource allocation model, to determine that processing traffic associated with a first endpoint device requires allocating a resource of the network device, as described above. The resource allocation model may include a heuristic model and/or a machine learning model. The resource may include a processor resource associated with a processor of the network device, a memory resource associated with a memory of the network device, a network address associated with the network device, a network port associated with the network device, and/or the like.

As further shown in FIG. 5, process 500 may include processing the configuration data, with the resource allocation model, to identify the resource of the network device from a particular resource of the network device that is currently allocated to traffic associated with a second endpoint device (block 540). For example, the network device may process the configuration data, with the resource allocation model, to identify the resource of the network device from a particular resource of the network device that is currently allocated to traffic associated with a second endpoint device, as described above.

The network device may identify the resource of the network device from the particular resource of the network device based on a processor eviction scheme associated with the second endpoint device, a memory eviction scheme associated with the second endpoint device, a network address eviction scheme associated with the second endpoint device, and/or an application eviction scheme associated with the second endpoint device. Alternatively, and/or additionally, the network device may identify the resource of the network device from the particular resource of the network device based on a time of day eviction scheme associated with the second endpoint device.

In some implementations, the network device may determine that the network device is not utilizing the particular resource to process the traffic associated with the second endpoint device. The network device may identify the resource of the network device from the particular resource of the network device based on the network device not utilizing the particular resource to process the traffic associated with the second endpoint device.

In some implementations, the network device may determine that the network device is utilizing the particular resource to process traffic associated with an application of the second endpoint device with a lower priority than a priority of an application associated with the first endpoint device. The network device may identify the resource of the network device from the particular resource of the network device based on the network device utilizing the particular resource to process the traffic associated with the application of the second endpoint device with the lower priority than the priority of the application associated with the first endpoint device.

In some implementations, the network device may determine that the network device is utilizing the particular resource to process the traffic associated with the second endpoint device with a lower priority than the traffic associated with the first endpoint device. The network device may identify the resource of the network device from the particular resource of the network device based on the network device utilizing the particular resource to process the traffic associated with the second endpoint device with the lower priority than the traffic associated with the first endpoint device.

As further shown in FIG. 5, process 500 may include allocating the particular resource of the network device from the traffic associated with the second endpoint device to the traffic associated with the first endpoint device (block 550). For example, the network device may allocate the particular resource of the network device from the traffic associated with the second endpoint device to the traffic associated with the first endpoint device, as described above.

As further shown in FIG. 5, process 500 may include processing the traffic associated with the first endpoint device with the particular resource to generate processed traffic (block 560). For example, the network device may process the traffic associated with the first endpoint device with the particular resource to generate processed traffic, as described above.

In some implementations, the network device may perform one or more actions based on the processed traffic. For example, the network device may cause the processed traffic to be routed to a destination, may prevent the processed traffic from being routed to the destination due to a security issue with the processed traffic, may store the processed traffic, and/or the like. Alternatively, and/or additionally, the network device may provide a recommendation that resources be installed in the network device, provide a recommendation that an additional network device be installed in a network associated with the network device, and/or the like.

In some implementations, the network device may determine, based on the configuration data and after allocating the particular resource of the network device from the traffic associated with the second endpoint device to the traffic associated with the first endpoint device, that a resource subscription threshold associated with the second endpoint device is satisfied. The resource subscription threshold may include a processor threshold associated with a processor of the network device, a memory threshold associated with a memory of the network device, a network address threshold associated with network addresses of the network device, a network port threshold associated with network ports of the network device, and/or the like. The network device may reallocate the particular resource of the network device from the traffic associated with the first endpoint device back to the traffic associated with the second endpoint device based on the resource subscription threshold associated with the second endpoint device being satisfied.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a network device, configuration data identifying respective resource subscription thresholds associated with a plurality of endpoint devices;
  receiving, by the network device, traffic from the plurality of endpoint devices;
  processing, by the network device, the traffic and the configuration data, with a resource allocation model, to determine that processing traffic associated with a first endpoint device requires allocating a resource of the network device;
  processing, by the network device, the configuration data, with the resource allocation model, to identify the resource of the network device from a particular resource of the network device that is currently allocated to traffic associated with a second endpoint device;
  allocating, by the network device, the particular resource of the network device from the traffic associated with the second endpoint device to the traffic associated with the first endpoint device,
    wherein the particular resource of the network device is allocated to the traffic associated with the first endpoint device based on an eviction scheme associated with the particular resource and comparing a maximum resource threshold with a resource subscription threshold of the respective resource subscription thresholds associated with the second endpoint device; and
  processing, by the network device, the traffic associated with the first endpoint device with the particular resource to generate processed traffic.

2. The method of claim 1, further comprising:
  determining, based on the configuration data and after allocating the particular resource of the network device from the traffic associated with the second endpoint device to the traffic associated with the first endpoint device, that the respective resource subscription threshold is satisfied; and
  reallocating the particular resource of the network device from the traffic associated with the first endpoint device back to the traffic associated with the second endpoint device based on the resource subscription threshold associated with the second endpoint device being satisfied.

3. The method of claim 2, wherein the resource subscription threshold includes one of:
  a processor threshold associated with a processor of the network device,
  a memory threshold associated with a memory of the network device,
  a network address threshold associated with network addresses of the network device, or
  a network port threshold associated with network ports of the network device.

4. The method of claim 1, wherein the respective resource subscription thresholds include one or more of:
  a processor threshold associated with a processor of the network device,
  a memory threshold associated with a memory of the network device,
  a network address threshold associated with network addresses of the network device, or
  a network port threshold associated with network ports of the network device.

5. The method of claim 1, wherein the resource allocation model includes one of a heuristic model or a machine learning model.

6. The method of claim 1, wherein processing the configuration data, with the resource allocation model, to identify the resource of the network device from the particular resource of the network device comprises one or more of:
  identifying the resource of the network device from the particular resource of the network device based on a processor eviction scheme associated with the second endpoint device;
  identifying the resource of the network device from the particular resource of the network device based on a memory eviction scheme associated with the second endpoint device;

identifying the resource of the network device from the particular resource of the network device based on a network address eviction scheme associated with the second endpoint device; or identifying the resource of the network device from the particular resource of the network device based on an application eviction scheme associated with the second endpoint device.

7. The method of claim 1, wherein processing the configuration data, with the resource allocation model, to identify the resource of the network device from the particular resource of the network device comprises:

identifying the resource of the network device from the particular resource of the network device based on a time of day eviction scheme associated with the second endpoint device.

8. A network device, comprising:
one or more memories; and
one or more processors to:
receive configuration data identifying respective resource subscription thresholds associated with a plurality of endpoint devices,
wherein the respective resource subscription thresholds include one or more of:
a processor threshold associated with a processor of the network device,
a memory threshold associated with a memory of the network device,
a network address threshold associated with network addresses of the network device, or
a network port threshold associated with network ports of the network device;
receive traffic from the plurality of endpoint devices;
process the traffic and the configuration data, with a resource allocation model, to determine that processing traffic associated with a first endpoint device requires allocating a resource of the network device;
process the configuration data, with the resource allocation model, to identify the resource of the network device from a particular resource of the network device that is currently allocated to traffic associated with a second endpoint device;
allocate the particular resource of the network device from the traffic associated with the second endpoint device to the traffic associated with the first endpoint device,
wherein the particular resource of the network device is allocated to the traffic associated with the first endpoint device based on an eviction scheme associated with the particular resource and comparing a maximum resource threshold with a resource subscription threshold of the respective resource subscription thresholds associated with the second endpoint device; and
process the traffic associated with the first endpoint device with the particular resource to generate processed traffic; and
perform one or more actions based on the processed traffic.

9. The network device of claim 8, wherein the one or more processors, to process the configuration data, with the resource allocation model, to identify the resource of the network device from the particular resource of the network device, are to:
determine that the network device is not utilizing the particular resource to process the traffic associated with the second endpoint device; and
identify the resource of the network device from the particular resource of the network device based on the network device not utilizing the particular resource to process the traffic associated with the second endpoint device.

10. The network device of claim 8, wherein the one or more processors, to process the configuration data, with the resource allocation model, to identify the resource of the network device from the particular resource of the network device, are to:
determine that the network device is utilizing the particular resource to process traffic associated with an application of the second endpoint device with a lower priority than a priority of an application associated with the first endpoint device; and
identify the resource of the network device from the particular resource of the network device based on the network device utilizing the particular resource to process the traffic associated with the application of the second endpoint device with the lower priority than the priority of the application associated with the first endpoint device.

11. The network device of claim 8, wherein the one or more processors, to perform the one or more actions, are to:
cause the processed traffic to be routed to a destination;
prevent the processed traffic from being routed to the destination due to a security issue with the processed traffic; or
store the processed traffic.

12. The network device of claim 8, wherein the one or more processors, to process the configuration data, with the resource allocation model, to identify the resource of the network device from the particular resource of the network device, are to:
determine that the network device is utilizing the particular resource to process the traffic associated with the second endpoint device with a lower priority than the traffic associated with the first endpoint device; and
identify the resource of the network device from the particular resource of the network device based on the network device utilizing the particular resource to process the traffic associated with the second endpoint device with the lower priority than the traffic associated with the first endpoint device.

13. The network device of claim 8, wherein the one or more processors, to perform the one or more actions, are to:
provide a recommendation that resources be installed in the network device; or
provide a recommendation that an additional network device be installed in a network associated with the network device.

14. The network device of claim 8, wherein the network device is a network security device.

15. A non-transitory computer-readable medium storing a set of instructions, the set of instructions comprising:
one or more instructions that, when executed by one or more processors of a network device, cause the network device to:
receive configuration data identifying resource subscription thresholds associated with a plurality of endpoint devices;
receive traffic from the plurality of endpoint devices;
process the traffic and the configuration data, with a resource allocation model, to determine that processing traffic associated with a first endpoint device requires allocating a resource of the network device;

process the configuration data, with the resource allocation model, to identify the resource of the network device from a particular resource of the network device that is currently allocated to traffic associated with a second endpoint device;

allocate the particular resource of the network device from the traffic associated with the second endpoint device to the traffic associated with the first endpoint device,
    wherein the particular resource of the network device is allocated to the traffic associated with the first endpoint device based on comparing a maximum resource threshold with a resource subscription threshold of the resource subscription thresholds associated with the second endpoint device; and process the traffic associated with the first endpoint device with the particular resource to generate processed traffic.

16. The non-transitory computer-readable medium of claim 15, wherein the one or more instructions further cause the network device to:
    determine, based on the configuration data and after allocating the particular resource of the network device from the traffic associated with second endpoint device to the traffic associated with the first endpoint device, that the resource subscription threshold is satisfied; and
    reallocate the particular resource of the network device from the traffic associated with the first endpoint device back to the traffic associated with the second endpoint device based on the resource subscription threshold associated with the second endpoint device being satisfied.

17. The non-transitory computer-readable medium of claim 15, wherein the one or more instructions, that cause the network device to process the configuration data, with the resource allocation model, to identify the resource of the network device from the particular resource of the network device, cause the network device to one or more of:
    identify the resource of the network device from the particular resource of the network device based on a processor eviction scheme associated with the second endpoint device;
    identify the resource of the network device from the particular resource of the network device based on a memory eviction scheme associated with the second endpoint device;
    identify the resource of the network device from the particular resource of the network device based on a network address eviction scheme associated with the second endpoint device; or
    identify the resource of the network device from the particular resource of the network device based on an application eviction scheme associated with the second endpoint device.

18. The non-transitory computer-readable medium of claim 15, wherein the one or more instructions, that cause the network device to process the configuration data, with the resource allocation model, to identify the resource of the network device from the particular resource of the network device, cause the network device to:
    identify the resource of the network device from the particular resource of the network device based on a time of day eviction scheme associated with the second endpoint device.

19. The non-transitory computer-readable medium of claim 15, wherein the one or more instructions, that cause the network device to process the configuration data, with the resource allocation model, to identify the resource of the network device from the particular resource of the network device, cause the network device to:
    determine that the network device is utilizing the particular resource to process traffic associated with an application of the second endpoint device with a lower priority than a priority of an application associated with the first endpoint device; and
    identify the resource of the network device from the particular resource of the network device based on the network device utilizing the particular resource to process the traffic associated with the application of the second endpoint device with the lower priority than the priority of the application associated with the first endpoint device.

20. The non-transitory computer-readable medium of claim 15, wherein the one or more instructions, that cause the network device to process the configuration data, with the resource allocation model, to identify the resource of the network device from the particular resource of the network device, cause the network device to:
    determine that the network device is utilizing the particular resource to process the traffic associated with the second endpoint device with a lower priority than the traffic associated with the first endpoint device; and
    identify the resource of the network device from the particular resource of the network device based on the network device utilizing the particular resource to process the traffic associated with the second endpoint device with the lower priority than the traffic associated with the first endpoint device.

* * * * *